United States Patent
Kulkarni

(10) Patent No.: US 10,733,553 B2
(45) Date of Patent: Aug. 4, 2020

(54) ACTION ITEM EXTRACTION FOR WORK ITEM CREATION

(71) Applicant: Microsoft Technology Licensing, LLC., Redmond, WA (US)

(72) Inventor: Ashish Arvind Kulkarni, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 477 days.

(21) Appl. No.: 15/266,973

(22) Filed: Sep. 15, 2016

(65) Prior Publication Data

US 2018/0075387 A1    Mar. 15, 2018

(51) Int. Cl.
*G06Q 10/06*   (2012.01)
*G06Q 10/10*   (2012.01)
*G06F 40/134*  (2020.01)

(52) U.S. Cl.
CPC ..... *G06Q 10/06316* (2013.01); *G06Q 10/103* (2013.01); *G06F 40/134* (2020.01)

(58) Field of Classification Search
None
See application file for complete search history.

(56) References Cited

U.S. PATENT DOCUMENTS

| 8,949,275 | B1 | 2/2015 | Aasuri-Maringanti | |
|---|---|---|---|---|
| 9,002,954 | B2 | 4/2015 | Liao et al. | |
| 9,460,422 | B2 * | 10/2016 | Reter | G06Q 10/109 |
| 9,754,224 | B2 * | 9/2017 | Bradley | G06Q 10/06 |
| 9,904,435 | B2 * | 2/2018 | Savage | G06Q 10/103 |
| 10,528,385 | B2 * | 1/2020 | Kumar | G06F 9/4843 |
| 2003/0101086 | A1 * | 5/2003 | San Miguel | G06Q 10/06311 705/7.13 |
| 2004/0205657 | A1 * | 10/2004 | Kudo | G06F 17/2241 715/205 |
| 2006/0069599 | A1 * | 3/2006 | Hatoun | G06Q 10/06 705/7.27 |
| 2006/0167737 | A1 * | 7/2006 | Muller | G06Q 10/06311 705/7.13 |
| 2006/0173879 | A1 | 8/2006 | MacFarlane et al. | |
| 2007/0130121 | A1 * | 6/2007 | Dolph | G06F 17/21 |
| 2007/0130163 | A1 | 6/2007 | Perez et al. | |

(Continued)

OTHER PUBLICATIONS

"Create New Work Items from Emails, Meetings, or Tasks in TFS with TeamLook", Retrieved on: Jun. 20, 2016 Available at: https://www.youtube.com/watch?v=ovtGkA257fY.

(Continued)

*Primary Examiner* — Stephanie Z Delich

(57) ABSTRACT

Creating a work item in a work item tracking system from action item data in a productivity application document is provided. A work item extraction system receives a selection to create a work item from a string of data in the document, parses the string for work item attributes, and maps the work item attributes to fields in a work item creation form in a work item tracking system for creation of a task item. Further, a link to the created work item is generated and inserted into the document, which provides direct access the work item in the work item tracking system. The work item extraction system communicates with the work item tracking system for a status of the work item, and updates the document to indicate the status of the work item.

20 Claims, 15 Drawing Sheets

(56) References Cited

U.S. PATENT DOCUMENTS

| | | | | |
|---|---|---|---|---|
| 2009/0094623 | A1* | 4/2009 | Chakra | G06Q 10/109 719/329 |
| 2010/0268793 | A1 | 10/2010 | Wolff et al. | |
| 2011/0145823 | A1* | 6/2011 | Rowe | G06Q 10/109 718/100 |
| 2011/0314402 | A1 | 12/2011 | Kikin-Gil et al. | |
| 2012/0035925 | A1* | 2/2012 | Friend | G06F 3/167 704/235 |
| 2013/0091453 | A1* | 4/2013 | Kotler | G06Q 30/0209 715/772 |
| 2014/0052797 | A1* | 2/2014 | Lessard | H04L 51/18 709/206 |
| 2014/0258972 | A1* | 9/2014 | Savage | G06F 9/451 717/106 |
| 2016/0071064 | A1 | 3/2016 | Itani et al. | |
| 2016/0077674 | A1* | 3/2016 | Forster | G06F 3/0481 715/753 |
| 2017/0053244 | A1* | 2/2017 | Khalil | G06Q 10/103 |

OTHER PUBLICATIONS

"Connect Microsoft Excel or Microsoft Project to a team project", Retrieved on: Jun. 20, 2016 Available at: https://msdn.microsoft.com/en-us/library/ms181675.aspx.

"SmartOutlook4TFS", Retrieved on: Jun. 20, 2016 Available at: http://www.modernrequirements.com/smartoutlook4tfs/.

"About TeamLook", Retrieved on: Jun. 20, 2016 Available at: https://www.componentsource.com/product/teamlook/about.

White, Brian A., "Team Foundation Server: At Work", Published on: Oct. 2005 Available at: https://msdn.microsoft.com/en-us/library/ms364061(v=vs.80).aspx.

Aldrich, Merrill, "Poor Man's PowerShell TFS SSMS Integration Work", Published on: Apr. 4, 2012 Available at: http://sqlblog.com/blogs/merrill_aldrich/archive/2012/04/04/poor-man-s-powershell-tfs-ssms-integration.aspx.

Dube, Ryan, "Turn Outlook into a Project Management Tool with OneNote Integration", Published on: Jun. 23, 2015 Available at: http://www.makeuseof.com/tag/turn-outlook-project-management-tool-onenote-integration/.

"Project Tasks", Retrieved on: Jun. 20, 2016 Available at: https://www.zoho.com/projects/help/tasks.html.

Hyttinen, Roger, "Create Tasks from Email Messages in Apple Mail", Published on: Oct. 8, 2014 Available at: http://dailymactips.com/create-tasks-from-email-messages-in-apple-mail/.

"Use OneNote to create linked Appointment Tasks", Retrieved on: Jun. 20, 2016 Available at: https://www.msoutlook.info/question/use-onenote-to-create-linked-appointment-tasks.

"Google Tasks Review", Retrieved on: Jun. 20, 2016 Available at: https://zapier.com/zapbook/google-tasks/review/.

"International Search Report and Written Opinion Issued in PCT Application No. PCT/US2017/050875", dated Nov. 13, 2017, 10 Pages.

* cited by examiner

FIG. 2B

Notetaking Application – Project A

FILE  HOME  INSERT  SHARE  DRAW  REVIEW  VIEW

Notebooks ▼

Project A | Project B | Project C

Attendees
- Attendee 1
- Attendee 2
- Attendee 3
- Attendee 4

Minutes
- Current failing tests show high probability of a functional problem with features 1, 2, 3
- Feature 1 failures happen only after back-to-back events in input pipeline
  ○ Need to reproduce failure in isolated workspace.
  ○ Debug fail logs to understand common failure patterns.
- Feature 2, 3 failures are seen only after feature 1 has failed at least once
  ○ Are these fails present in earlier releases?

Action Items
- Attendee 1: Reproduce failure in special workspace synced to release #43: 02/05/2026
- Write a script parser to bucketize fail signatures: 02/10/2026 – Attendee 2
- Attendee 3: Reproduce failures in release #40 – Target date: 02/15/2026
- Reproduce failures in release #25 – Attendee 4 – 02/15/2026

Next Sync up

Subsection 1
Subsection 2
Subsection 3

Unfiled Notes

ACTION ITEM EXTRACTION FOR WORK ITEM CREATION

BACKGROUND

Work item tracking systems are oftentimes used in enterprises for defining work items and for tracking the progress of completion of the work items associated with a project. A work item may refer to a collection of pieces of data relating to an action to be performed, wherein the data may relate directly or indirectly to the action. For example, a work item in a work item tracking system used in a software development environment may relate to a software-related unit of work to be carried out by a development team, such as coding tasks or other work related to a bug fix, software application development, or an improvement/addition to a software application.

Oftentimes, work items are originated during meetings, and are typically documented in meeting notes or minutes. Users are increasingly using productivity applications to take notes/meeting minutes and to capture meeting information in an electronic document. For example, during a meeting, a user may utilize a free-form information gathering and multi-user collaboration application, a word processing application, a spreadsheet application, or other type of application to capture and keep track of information, such as work items assigned to various team members. Typically, when utilizing a work item tracking system for managing a project, work items originated during a meeting and documented in electronic documents are manually input into the work item tracking system.

As can be appreciated, it is inefficient for users to input work item information multiple times. Further, there is no association between work items in the work item tracking system and the document in which the work items are captured (e.g., meeting notes). Accordingly, a user may have to reference the work item tracking system to view the status of progress on work items, and manually update the document documenting the work items (e.g., meeting notes) to reflect any status updates.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and computer readable storage device for generation of a work item in a work item tracking system from selected data in a productivity application document. For example, a work item extraction system accesses a productivity application, receives a string associated with an action item from a document displayed in a user interface of the productivity application, parses the string for attributes defining a work item, creates a communication with a work item tracking system, and adds the parsed attributes defining a work item to fields of a work item creation form in the work item tracking system for creating a work item. In some examples, the work item extraction system receives a link to the work item, and embeds the link into the document for enabling direct access to the work item from the document. Further, in some examples, the work item extraction system creates a link to the document, and adds the link to a field of the work item creation form in the work item tracking system for enabling direct access to the document from the work item tracking system. Further, in some examples, the work item extraction system creates a subsequent communication with the work item tracking system, accesses the work item for checking a status of the work item, and updates the document with the status of the work item.

Examples are implemented as a computer process, a computing system, or as an article of manufacture such as a device, computer program product, or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
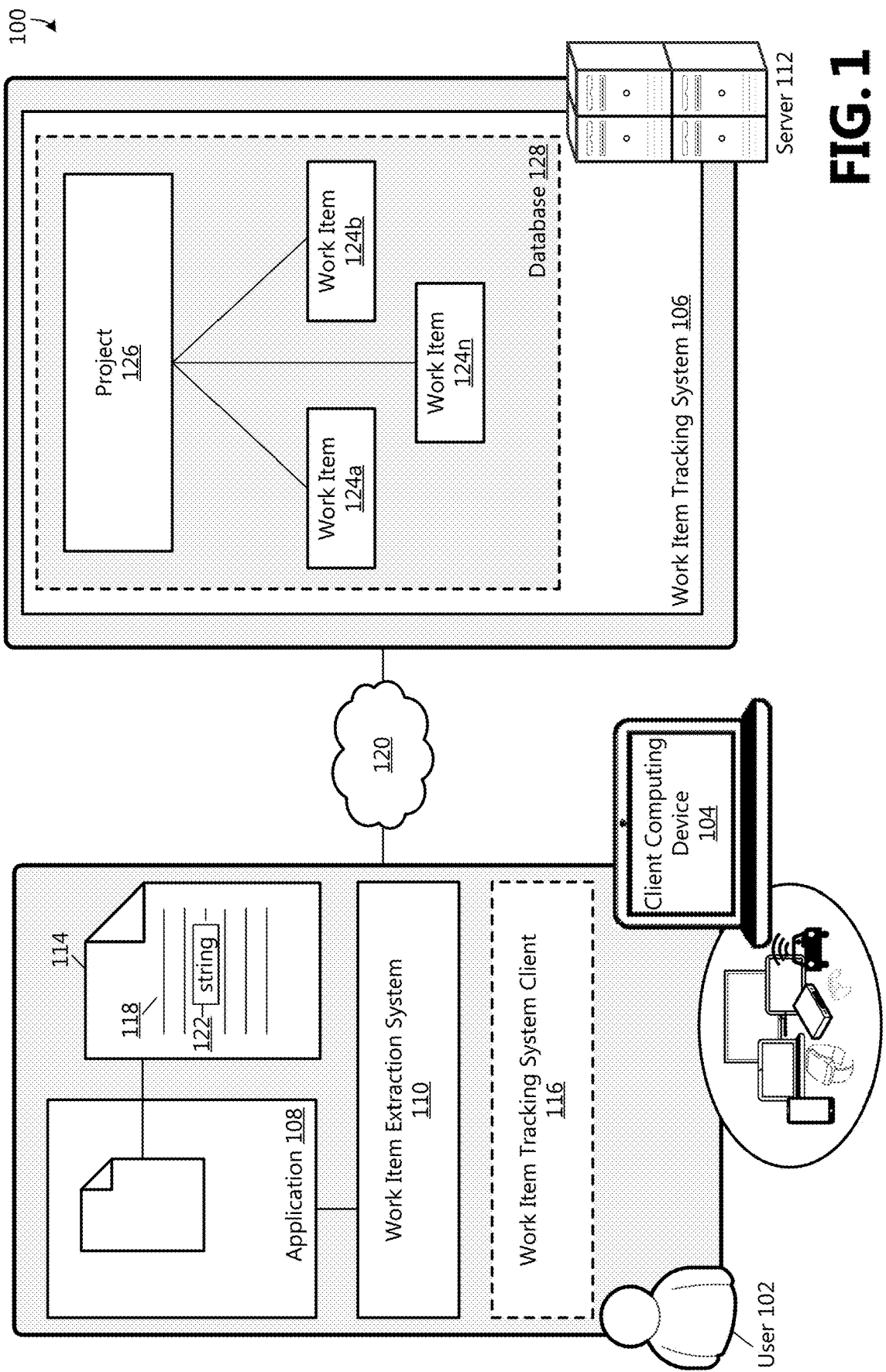
FIG. 1 is a block diagram showing an example operating environment for generation of a work item in a work item tracking system from selected data in a productivity application document.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer storage media for generating a work item in a work item tracking system from selected data in a productivity application document. Generation of a work item in the work item tracking system is performed in response to receiving a selection to create a work item from information in a captured string in the productivity application document. For example, users oftentimes utilize productivity applications to take notes/meeting minutes and to capture meeting information, including information relating to action items for one or more attendees or team members. A user is enabled to select a portion of data, such as a string including information related to an action item, and then select to create a work item in a work item tracking system from the information in the selected data. For example, the string including information related to an action item may include the action item, a person, persons, or team to whom the item is assigned, and a due date for the item.

A work item extraction system receives the selection, parses the selected string for work item information, and maps the work item information to the work item tracking system for creating a work item associated with a specific project and assigned to the person, persons, or team, which can be tracked project-wide along with other tasks and work items associated with the project. Further, a link to the created work item is generated and communicated back to the productivity application. The link can be inserted into the document, which when selected, opens the work item in the work item tracking system. Accordingly, the user is enabled to access the work item directly from the productivity application.

In some examples, the work item extraction system is operative to connect to the work item tracking system, and check the status of work items extracted from and linked to the document. Further, in some examples, the work item extraction system is operative to provide an indication of the status of the work items in the document such that the user is enabled to see whether each work item extracted from the document has been completed, is still pending, or is overdue.

The work item extraction system improves the functionality of devices comprising or connected to the work item extraction system by reducing resources (memory, processing, and bandwidth) needed to create work items in a work item tracking system. Among other benefits, the disclosed technology enables users to create work items in the work item tracking system from an application that is independent of the work item tracking system without requiring users to enter duplicate data in multiple applications. Advantageously, users are able to continue with their workflow using the productivity application, while a request to the work item tracking system to create a work item is communicated in the background.

By creating a connection between work items created in the work item tracking system and the productivity application document from which the work item information was extracted, the user can efficiently connect to the work items directly from the document or connect to the document from the created work items in the work item tracking system. Further, by utilizing tracking mechanisms of the work item tracking system and automatically updating the productivity application document with status information of work items extracted from the document, the user does not have to access the work items in the work item tracking system and manually update the document, resulting in more efficient user interaction and improved user interaction performance.

With reference now to FIG. 1, a simplified block diagram illustrating aspects of an example operating environment 100 in which generation of a work item in a work item tracking system from selected data in a productivity application document may be implemented. The example operating environment 100 includes a work item tracking system 106, illustrative of a software module, system, or device operative to provide project management services. The work item tracking system 106 may be implemented on a server 112 that maintains a database 128. In some examples, the work item tracking system 106 is a source code management system that provides a set of collaboration tools that enable development teams to collaboratively work on and manage software projects. According to aspects, the server 112 maintains one or more projects 126 associated with groups of related work. In FIG. 1, only one project 126 is shown for clarity. A plurality of work items 124a-n (collectively, 124) may be associated with a project 126, wherein a work item is a collection of pieces of data relating to an action to be performed. For example, a work item 124 in a work item tracking system 106 used in a software development environment may relate to a software-related unit of work to be carried out by a development team, such as coding tasks or other work related to a bug fix, software application development, or an improvement/addition to a software application. A work item 124 may be one of various work item types, such as an event, a requirement, a bug, and a task. Other work item types are possible and within the scope of the present disclosure.

The work item tracking system 106 allows users to define work items 124 associated with a project 126. A work item 124 may have one or more fields comprising data related to an attribute of the work item. In one example, a work item 124 includes a "title" field, which may comprise data representing a title of the work item. In another example, a work item 124 includes an "assigned to" field, which may comprise data representing a name of an individual and/or group that is responsible for completing the work item. In another example, a work item 124 includes a "due date" field, which may comprise data representing a target date for completion of the work item. Some work item types may provide for different types of fields and/or a greater or lesser number of fields than other work item types.

In some examples, work items 124 are defined, viewed, and edited via a work item tracking system client 116, such as a purpose-built client operating on a client computing device operating system, a web-hosted client, project team management software, or other suitable tool. According to an aspect, a work item 124 can be defined via a productivity application 108 executing on a client computing device 104. Client computing devices 104 may be connected via a network 120 connection to the server 112, and are operative to send and receive data associated with various work items 124 via the network connection. The network 120 may be any suitable network or combination of networks, such as, but not limited to, the Internet, wide area networks, local area networks, and combinations thereof. Examples of suitable client devices 104 include, but are not limited to, desktop computers, laptop computers, tablet computers, laptop/tablet hybrid computing devices, large screen multi-touch displays, mobile phones, personal digital assistants, wearable devices, gaming devices, connected automobiles, and smart appliances.

Examples of suitable applications 108 include, but are not limited to, a word processing application, a spreadsheet application, a slide presentation application, an electronic mail application, a drawing application, and a note-taking application. In some examples, the application 108 is a web application run on a server and provided via an online service. According to an aspect, web applications communicate via the network 120 with a user agent, such as a browser, executing on the client computing device 104. The user agent provides a user interface that allows the user 102 to interact with application content and electronic documents 114 stored in a storage repository. In other examples, the application 108 is a local application stored and executed on the client device 104.

The user 102 may utilize a productivity application 108 for viewing, generating, and editing electronic documents 114. In examples, the application 108 receives input from the user, such as text input, drawing input, etc., via various input methods, such as those relying on mice, keyboards, and remote controls, as well as Natural User Interface (NUI) methods, which enable a user to interact with a device in a "natural" manner, such as via speech recognition, touch and stylus recognition, gesture recognition both on screen and adjacent to the screen, air gestures, head and eye tracking, voice and speech, vision, touch, hover, gestures, and machine intelligence. The user input results in content 118 being added to the document 114. In some examples, content 118 is added within a document canvas (e.g., a page in a note-taking notebook document, a page in a word processing document, a spreadsheet in a spreadsheet document, a slide in a presentation document).

According to an aspect, the received user input includes a string 122 that includes data relating to an action item or task. For example, the user may utilize application 108 to take notes/meeting minutes and to capture meeting information, including information relating to action items for one or more attendees or team members. The string 122 may include information such as: the action item, a person, persons, or team to whom the item is assigned, and a due date for the item. The string 122 may include more or less information. In some examples, the string 122 is input according to a specific format, such as "AI: Title: Owner: DueDate." In other examples, the string 122 is not specifically formatted.

Figure 2:
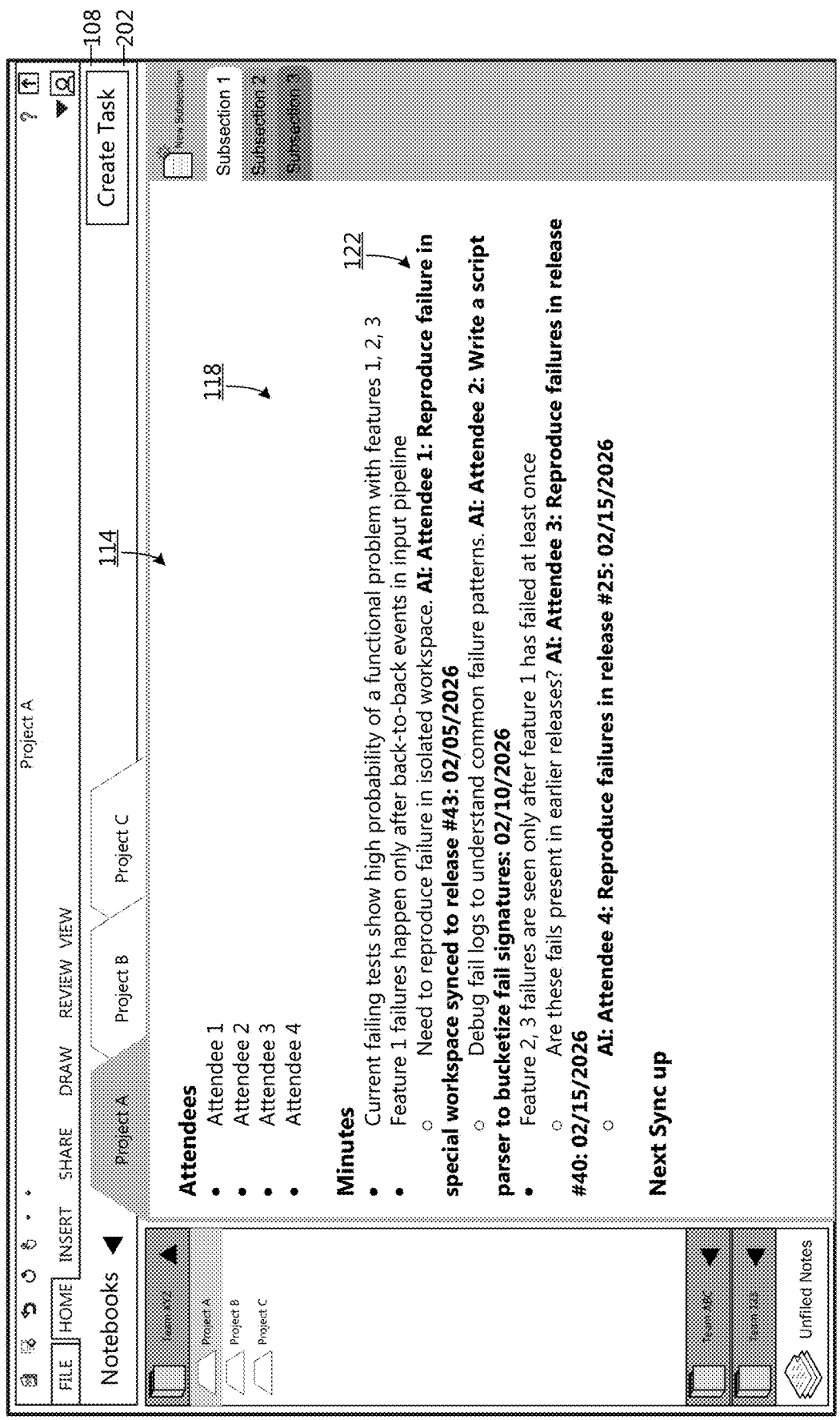
FIGS. 2A and 2B are illustrations of example documents including strings that comprise action item information for creating work items in a work item tracking system.

With reference to FIGS. 2A and 2B, examples of documents 114 including a string 122 that comprises action item information are illustrated in an example application user interface 202. The example documents 114 are notetaking documents created via a notetaking application 108, and comprise information from a meeting. For example, the documents 114 include a list of attendees, minutes from the meeting, and a plurality of action items. In the example illustrated in FIG. 2A, action items or strings 122 comprising action item information are shown formatted according to a specific format and are included with the minutes section of the document 114. In the example illustrated in FIG. 2B, action items or strings 122 comprising action item information are shown listed in an action item section. In this example, the strings 122 are not formatted according to a specific format. As should the appreciated, the user interface examples illustrated in FIGS. 2A and 2B are for purposes of illustration. Aspects may be implemented in many different forms and should not be construed as limited to the illustrated examples. For example and as described above, the application 108 and the document 114 comprising action item information may be one of various types of applications and document types.

With reference again to FIG. 1, according to aspects, the example operating environment 100 includes a work item extraction system 110, illustrative of a software module, system, or device communicatively attached to the application 108 and operative to receive a string 122 comprising information relating to an action item, parse the string for one or more attributes for defining a work item 124, and transmit the parsed attributes to the work item tracking system 106. According to an aspect, the parsed attributes are configured in a selected arrangement such that the parsed attributes maps to one or more fields in a work item creation form for creation of the work item in the work item tracking system 106. According to an aspect, the work item extraction system 110 communicates with the server 112 to generate the work item 124. According to an example, the work item extraction system 110 is implemented as a functionality of the application 108. According to another example, the work item extraction system 110 is implemented as one or more application programming interfaces (APIs) operative to enable the application 108 to communicate with the work item tracking system 106 to map parsed work item attributes from a productivity application document into one or more fields in the work item tracking system 106. According to another example, the work item extraction system 110 stores one or more scripts that may be executed to receive a string 122 comprising information relating to an action item, parse the string for one or more attributes for defining a work item 124, and map the parsed attributes into one or more fields in the work item tracking system 106 for creation of a work item in the work item tracking system 106.

Figure 3:
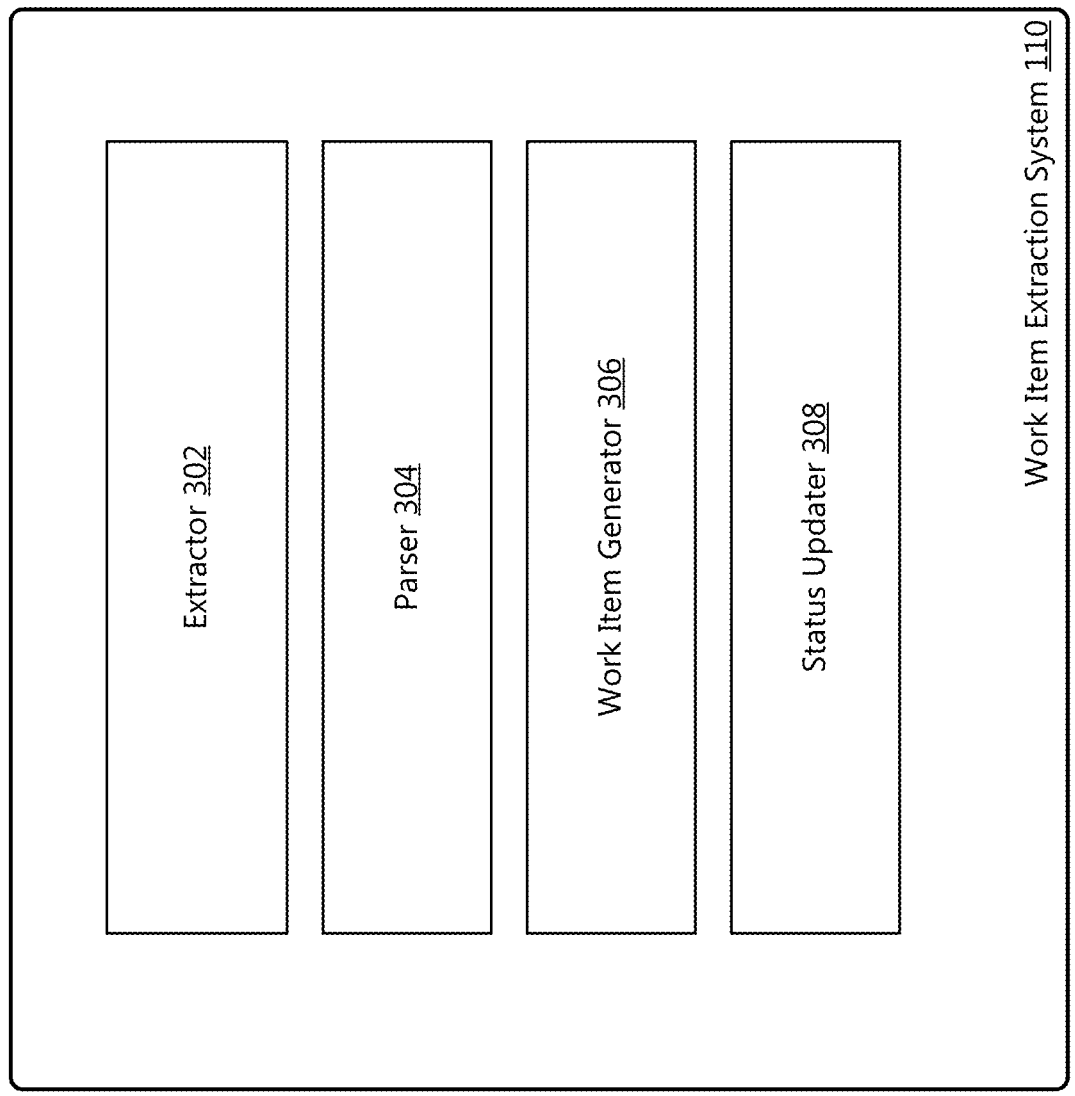
FIG. 3 is a block diagram showing components of a work item extraction system.

With reference now to FIG. 3, various components of the work item extraction system 110 are described. According to an aspect, the work item extraction system 110 comprises an extractor 302, operative to receive a string 122 comprising information associated with an action item. In one example, the extractor 302 receives a string 122 from a productivity application document 114 in response to receiving a selection of the string and a subsequent selection to create a work item 124 from information in the string.

According to an aspect, the work item extraction system 110 comprises a parser 304, operative to parse a received string 122 for action item information for generating a work item 124. According to one example, when an action item is formatted according to a specified format, the parser 304 is operative to identify action item information based on the structure of the string 122. According to another example, the parser 304 utilizes natural language processing for identifying action item information, such as a person's name, a date, and an action.

In some examples, the user 102 is not required to select a string 122. For example, an action item-related string 122 may be automatically recognized and extracted from a document 114. In some examples, the parser 304 is operative to parse a document 114 or a portion of a document for identifying a string 122 comprising action item information. In one example, when an action item string 122 is formatted according to a specified format, the parser 304 is operative to identify the action item string 122, and the extractor 302 is operative to extract the string. In another example, when an action item string 122 is not formatted according to a specified format, the parser 304 is operative to perform natural language processing for identifying the action item string 122. For example, the parser 304 may detect a string 122 comprising a person's name, a date, and an action. In some examples, the parser 304 parses a document 114 automatically, for example, as the user 102 is entering content 118, when the document 114 is saved, etc.

According to an aspect, the work item extraction system 110 comprises a work item generator 306, operative to connect to the work item tracking system server 112, create a work item 124, and map the parsed action item information into work item fields for generating the work item in the work item tracking system 106.

According to an aspect, the work item extraction system 110 connects to a specific project in the work item tracking system 106, and adds the work item 124 to the specific project. In one example, the project is associated with the productivity application document 114. For example, the project may be captured in the document's properties. In another example, the project is extracted from a heading or title of the document 114. In another example, a menu item is provided for enabling the user 102 to enter or select the project to which to add the work item 124.

According to an aspect, the work item generator 306 is further operative to receive a link to the work item 124 from the work item tracking system 106 and embed the link into the document 114. In one example, the work item tracking system 106 is operative to apply the link to the action item string 122 such that selection of the string leads the user directly to the work item 124 in the work item tracking system 106. In another example, the work item generator 306 generates and provides a link to the document 114 to the work item tracking system 106, and associates the link with the work item 124, such that the document can be accessed via a selection of the link from the work item in the work item tracking system.

According to an aspect, the work item extraction system 110 comprises a status updater 308, operative to connect to the work item tracking system 106, query the status of work items 124 created from action item information in the document 114, and provide an indication of the statuses of the work items in the document such that the user is enabled to see whether each work item has been completed, is still pending, or is overdue.

Figure 4A:
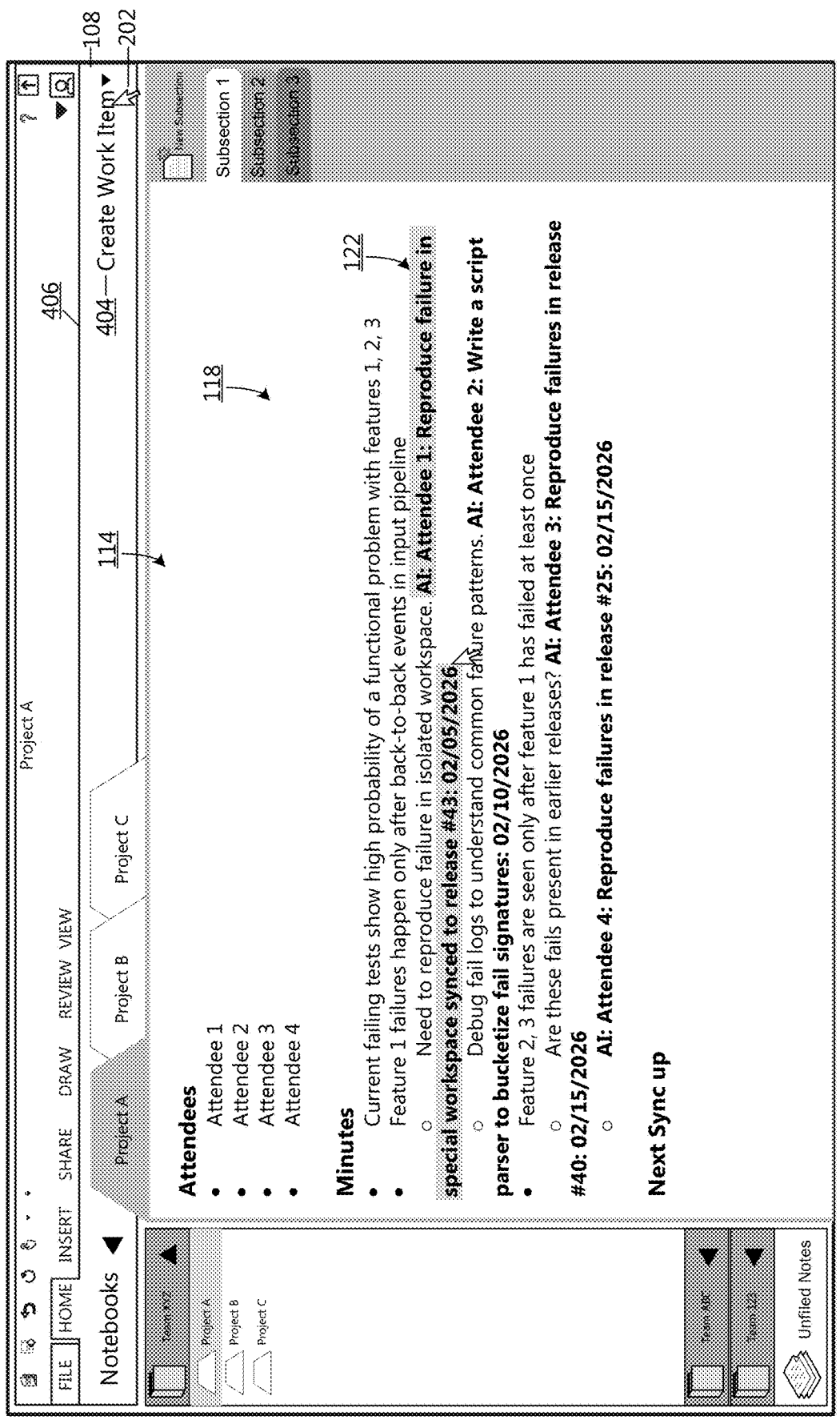
FIG. 4A is an illustration of an example create work item command displayed in an application user interface.

With reference now to FIG. 4A, an illustration is provided that shows an example create work item command. For example and as illustrated in FIG. 4A, the user 102 may highlight a portion of content 118 in the document 114, and subsequently select a create work item command 404. For example, the create work item command 404 may be provided in a toolbar 406 that includes various tools and settings related to authoring the content, such as: cut, copy, and paste tools; font settings; paragraph formatting settings; etc. In other aspects, the toolbar 406 includes fewer, additional, or different tools and settings. As another example, the user 102 may provide a selection of a create work item command via voice or other audio entry.

Figure 4B:
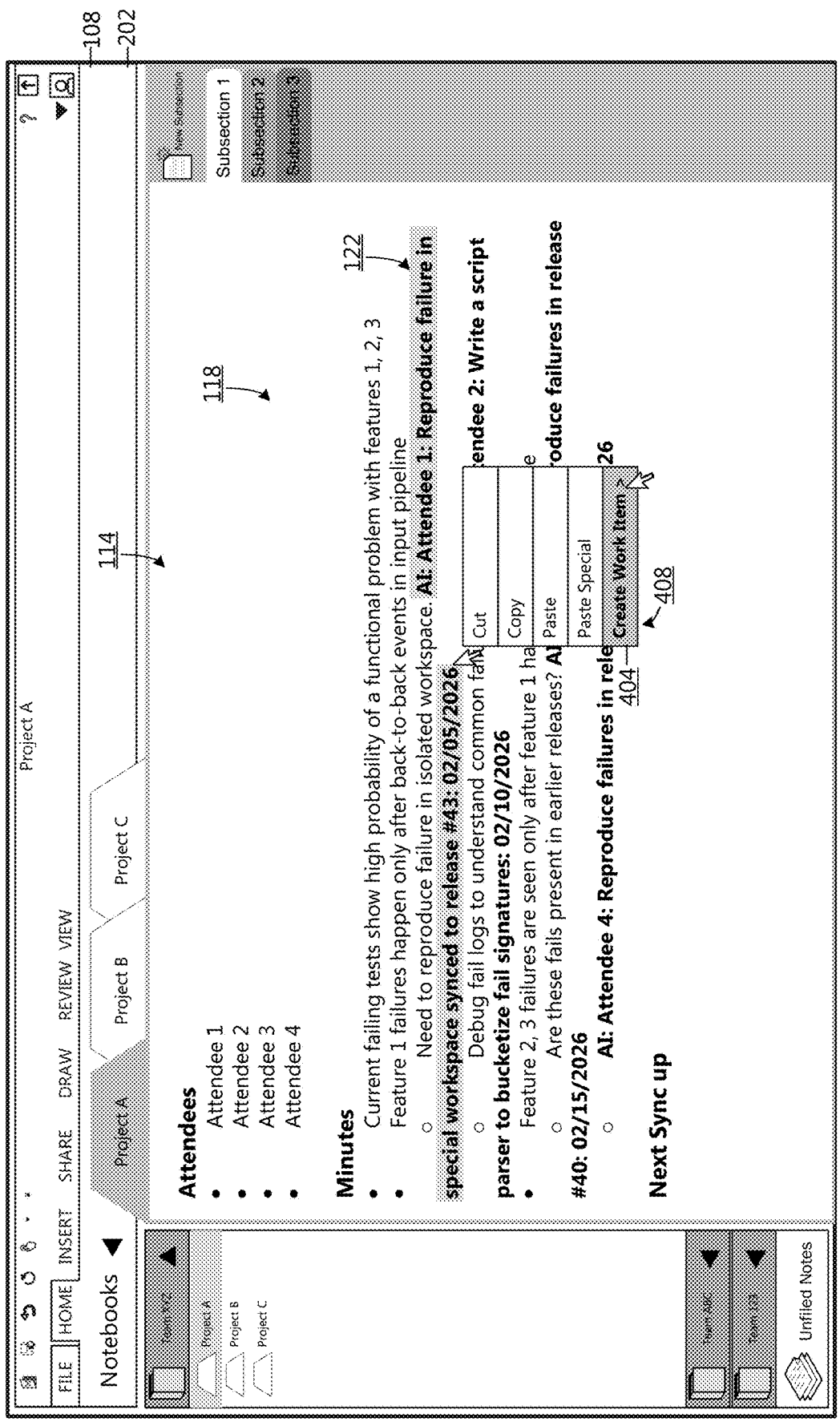
FIG. 4B is an illustration of an example create work item command displayed in a contextual menu.
Figure 4C:
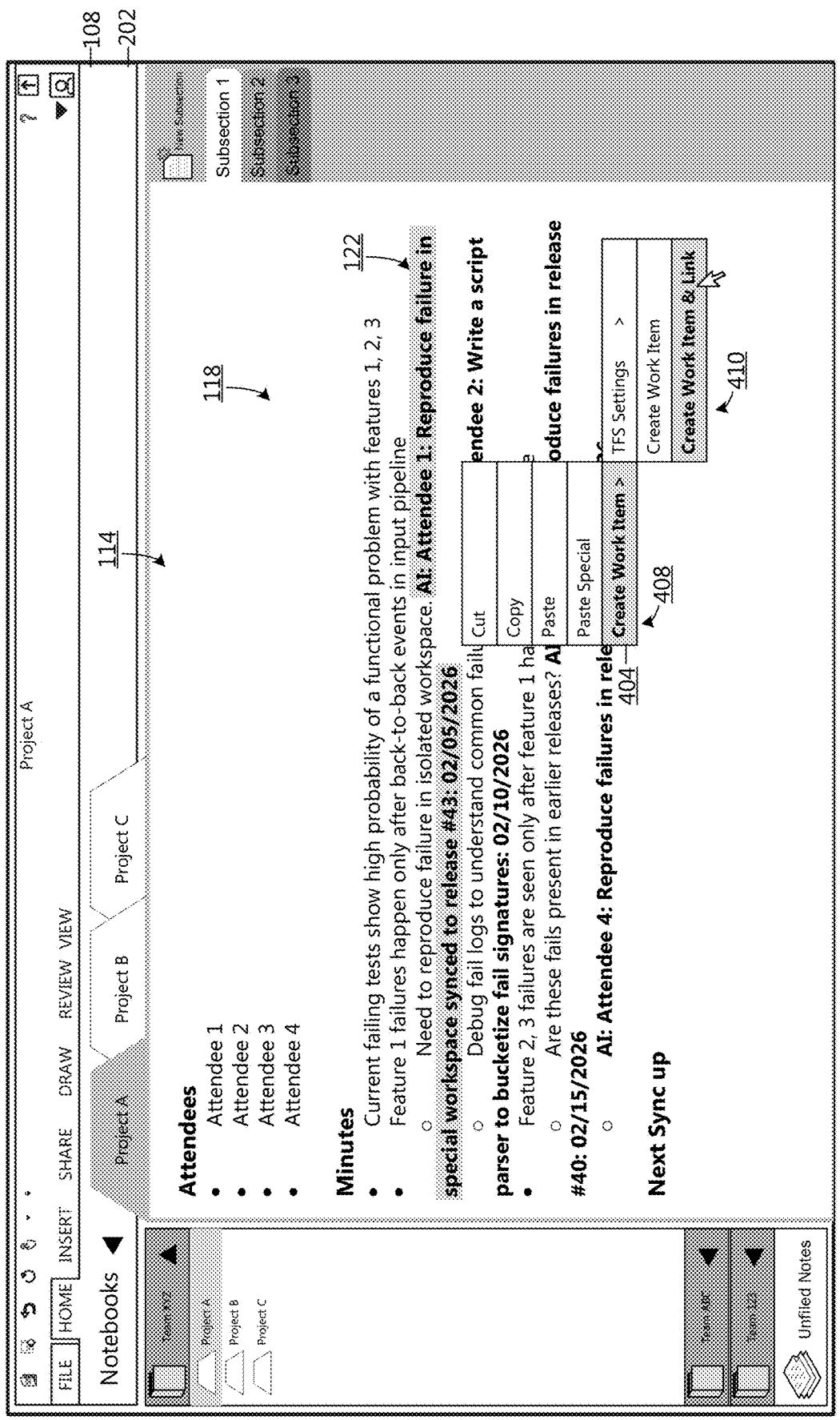
FIG. 4C is an illustration of additional options that can be provided in a contextual menu.

As another example and as illustrated in FIG. 4B, a create work item command 404 may be provided in a contextual menu 408 that may be displayed when the user 102 highlights a string 122 or upon receiving an indication of a right-click. In some examples and as illustrated in FIG. 4C, additional work item-creation options 410 may be provided. For example, the additional work item-creation options 410 may include such options as a settings option, an option to create a work item, or an option to create a work item and generate a link for embedding into the document 114 that connects the document to the created work item 124 in the work item tracking system 106. As should be appreciated, the user interface examples illustrated in FIGS. 4A-C are for purposes of illustration. Aspects may be implemented in many different forms and should not be construed as limited to the illustrated examples.

Figure 5A:
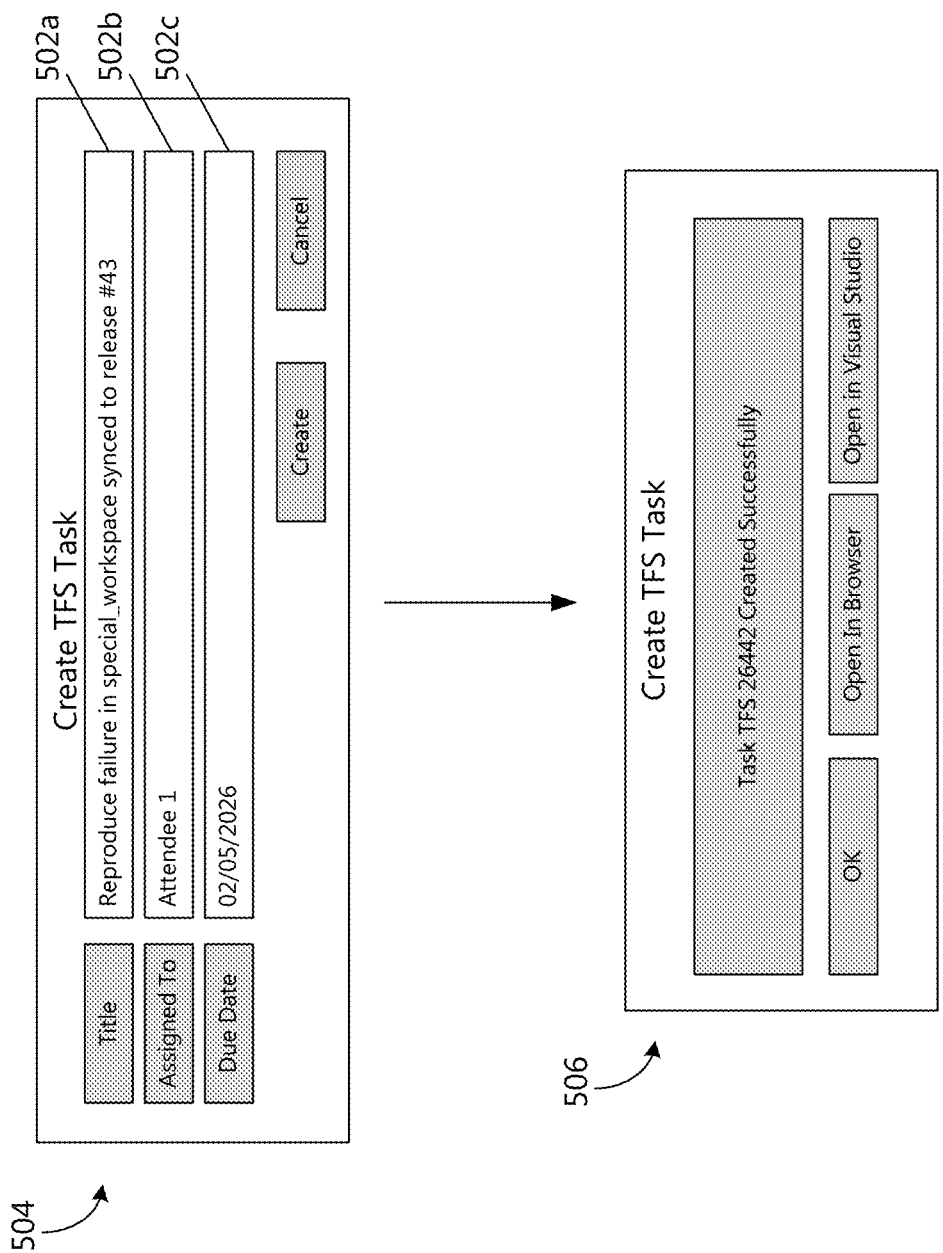
FIG. 5A is an illustration of example work item creation user interface elements.

An example of action item information mapped into work item fields 502a-c for generating a work item 124 in the work item tracking system 106 is illustrated in FIG. 5A. For example, information from the highlighted string 122 in FIG. 4C is shown parsed and mapped into a "title" field 502a, an "assigned to" field 502b, and a "due date" field 502c. In some examples, a user interface element, such as the example work item user interface element 504 illustrated in FIG. 5A, is displayed in the application user interface 202 when the work item extraction system 110 generates a work item. In some examples, a user interface element, such as the example work item created user interface element 506 illustrated in FIG. 5A, is displayed in the application user interface 202 when a work item 124 is successfully created in the work item tracking system 106. An example of the work item created user interface element 506 displayed in the application user interface 202 upon successful creation of a work item 124 is illustrated in FIG. 5B.

Figure 5B:
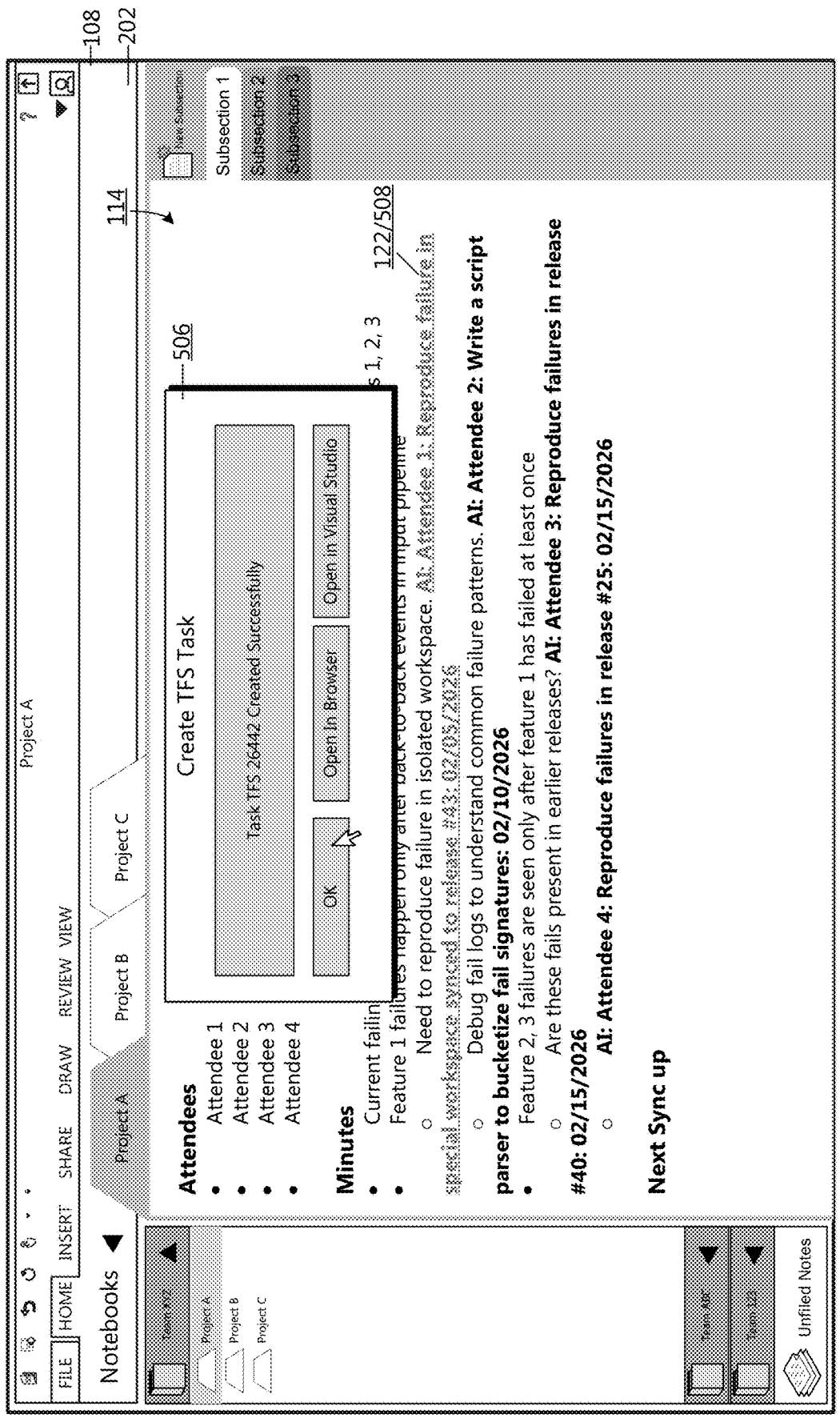
FIG. 5B is an illustration of an example user interface element displayed in an application user interface when a work item is generated.

With reference now to FIG. 5B, an example of a link 508 applied to an action item string 122 is illustrated.

Figure 6:
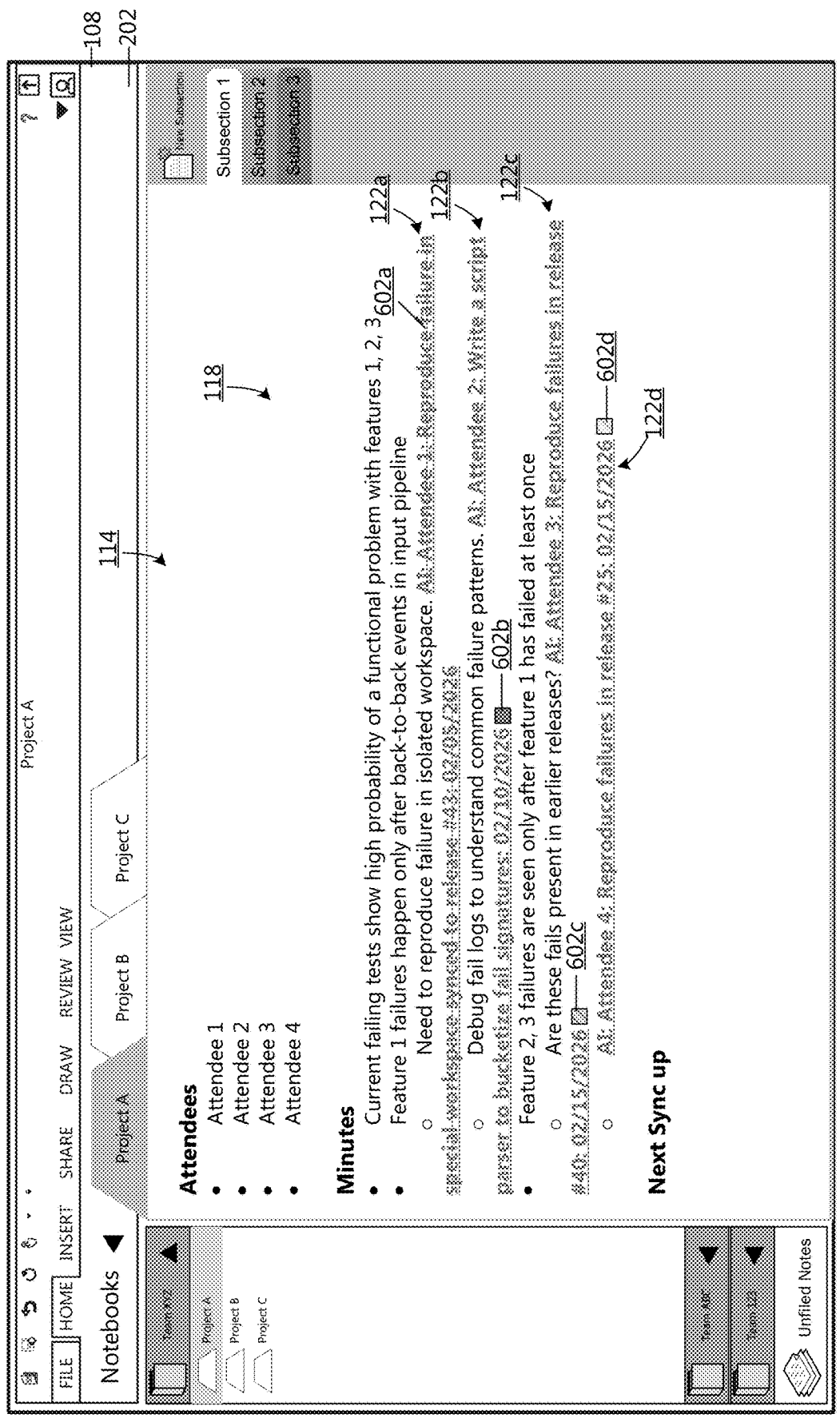
FIG. 6 is an illustration of example status indicators displayed in an application user interface indicating the status of work items.

With reference to FIG. 6, example status indicators 602a-d indicating the statuses of work items 124 created from action item information in the document 114 are shown displayed with the action item strings 122 associated with the created work items 124. For example, the first string 122a is associated with a work item 124 that has been completed. The status indicator 602a in this example is a strikethrough to indicate that the action item has been completed. As another example, the second string 122b is associated with a work item 124 that is overdue. The status indicator 602b for this example is a colored or shaded element that indicates that the action item is overdue. As another example, the third and fourth strings 122c,122d are associated with work items 124 that are still pending. The status indicators 602c,d in this example are shown as colored or shaded elements that indicate that the action items are still pending. In other examples, status indicators 602 may be represented as text (e.g., "completed," "overdue," "pending"), as a percentage of completion (e.g., 100%, 75%, 0%), or as a color of text (e.g., the color of the string 122 is updated to a color indicative of the status of the associated work item). As should be appreciated, these are non-limiting examples. Other status indicator types are possible and are within the scope of the disclosure.

Figure 7:
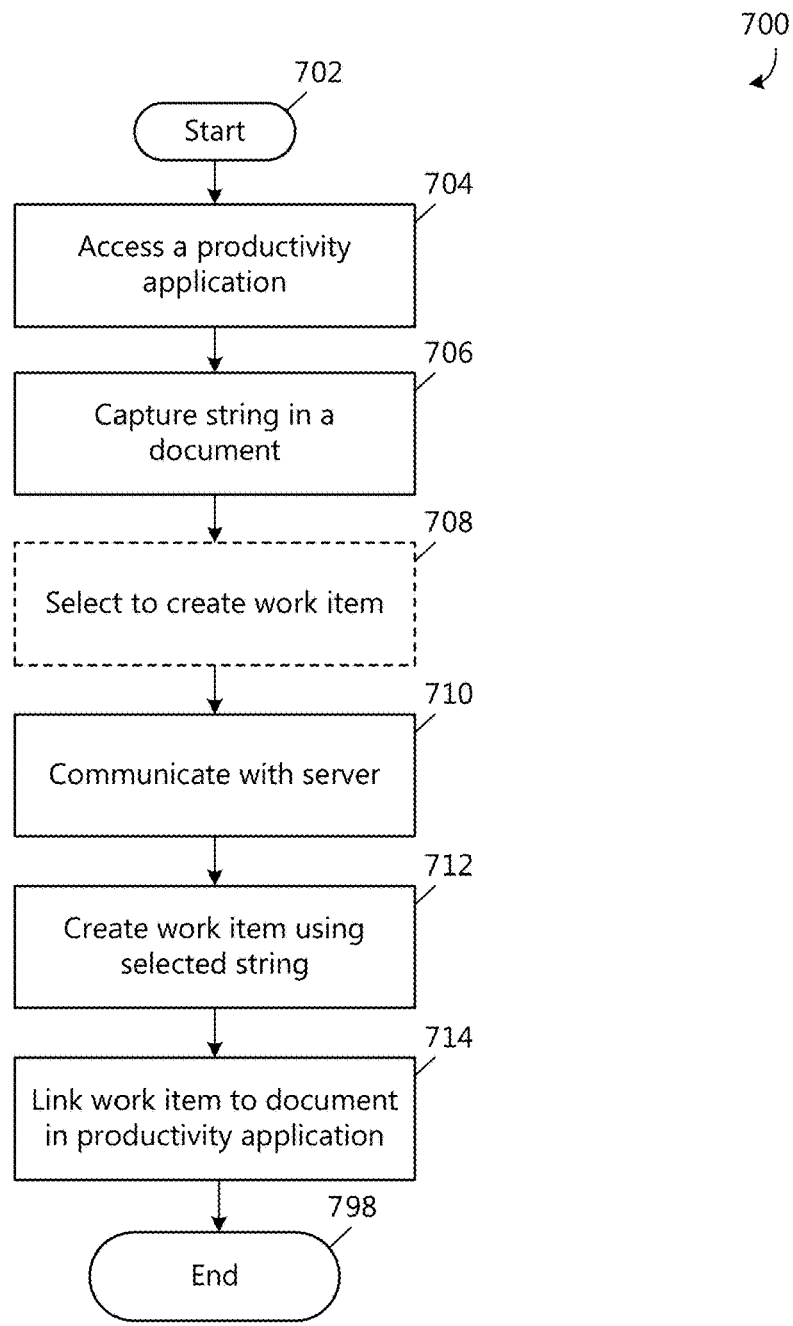
FIG. 7 is a flow chart showing general stages involved in an example method for generating a work item in a work item tracking system from selected data in a productivity application document

Having described an operating environment 100, components of the work item extraction system 110, and various user interface display examples with respect to FIGS. 1-6, FIG. 7 is a flow chart showing general stages involved in an example method 700 for generating a work item 124. With reference now to FIG. 7, the method 700 begins at start OPERATION 702, and proceeds to OPERATION 704, where a productivity application 108 is accessed, and a document 114 is created or opened. For example, the productivity application 108 may be one of various types of applications, such as a word processing application, a spreadsheet application, a slide presentation application, an electronic mail application, a drawing application, a note-taking application, and the like.

The method 700 proceeds to OPERATION 706, where an action item string 122 in the document 114 is captured. In some examples, the string 122 is selected by the user 102. In other examples, the string 122 is identified as a string that comprises action item information, and is automatically selected. For example, the string 122 may comprise various pieces of information related to an action item, such as a title or action, an owner or person/persons responsible for completion of the action, and a due date associated with when the action should be completed.

The method 700 continues to optional OPERATION 708, where a selection to create a work item 124 is received. For example, the user 102 may select a create work item command 404 displayed in the application user interface 202 or in a contextual menu, may speak the selection, or may select to create a work item 124 via other methods. In some examples, the method 700 may skip OPERATION 708, such as when the work item extraction system 110 automatically extracts one or more strings 122 and connects with the work item tracking system 106 for generating one or more work items 124.

At OPERATION 710, the work item extraction system 110 connects with the work item tracking system 106 over a network, and at OPERATION 712, the work item extraction system parses the string 122 for action item information, and maps the parsed information into work item fields 502 for creation of a work item 124.

The method 700 proceeds to OPERATION 714, where the created work item 124 is linked to the document 114. For example, a link 508 to the work item 124 is embedded in the document 114 and associated with the action item string 122 from which the work item was created. Selection of the link 508 enables the user 102 to connect directly with the work item 124 in the work item tracking system 106. Further, in some examples, a link to the document 114 is created and added to the work item 124, such that selection of the link in the work item tracking system 106 enables the user to connect directly with the document 114. In some examples, at OPERATION 714, the work item extraction system 110 connects with the work item tracking system 106 for receiving status information of work items 124 associated with the document 114, and updates the document with the status information. The method 700 ends at OPERATION 798.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 8:
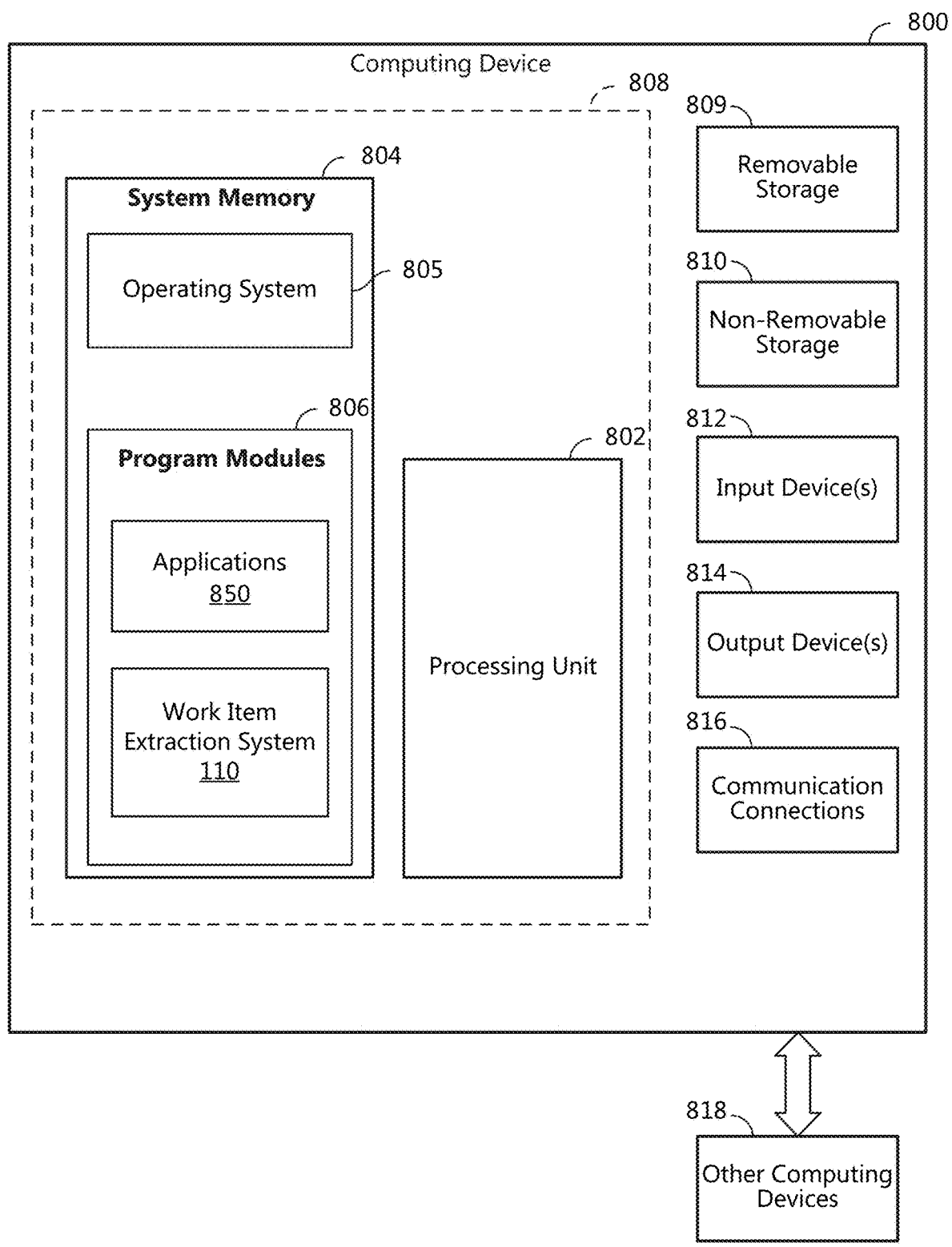
FIG. 8 is a block diagram illustrating example physical components of a computing device.
Figure 9A:
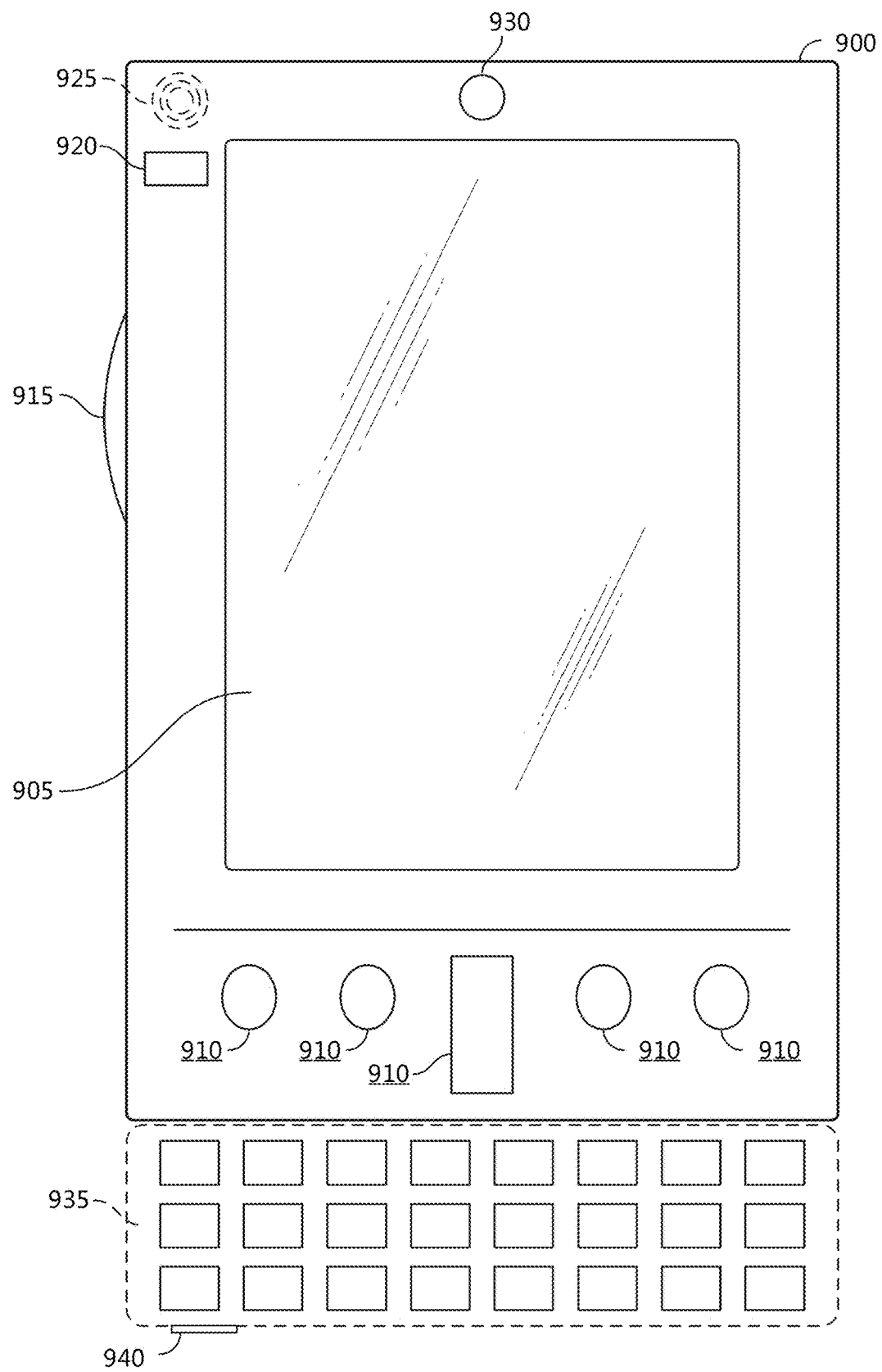
FIGS. 9A and 9B are simplified block diagrams of a mobile computing device.
Figure 9B:
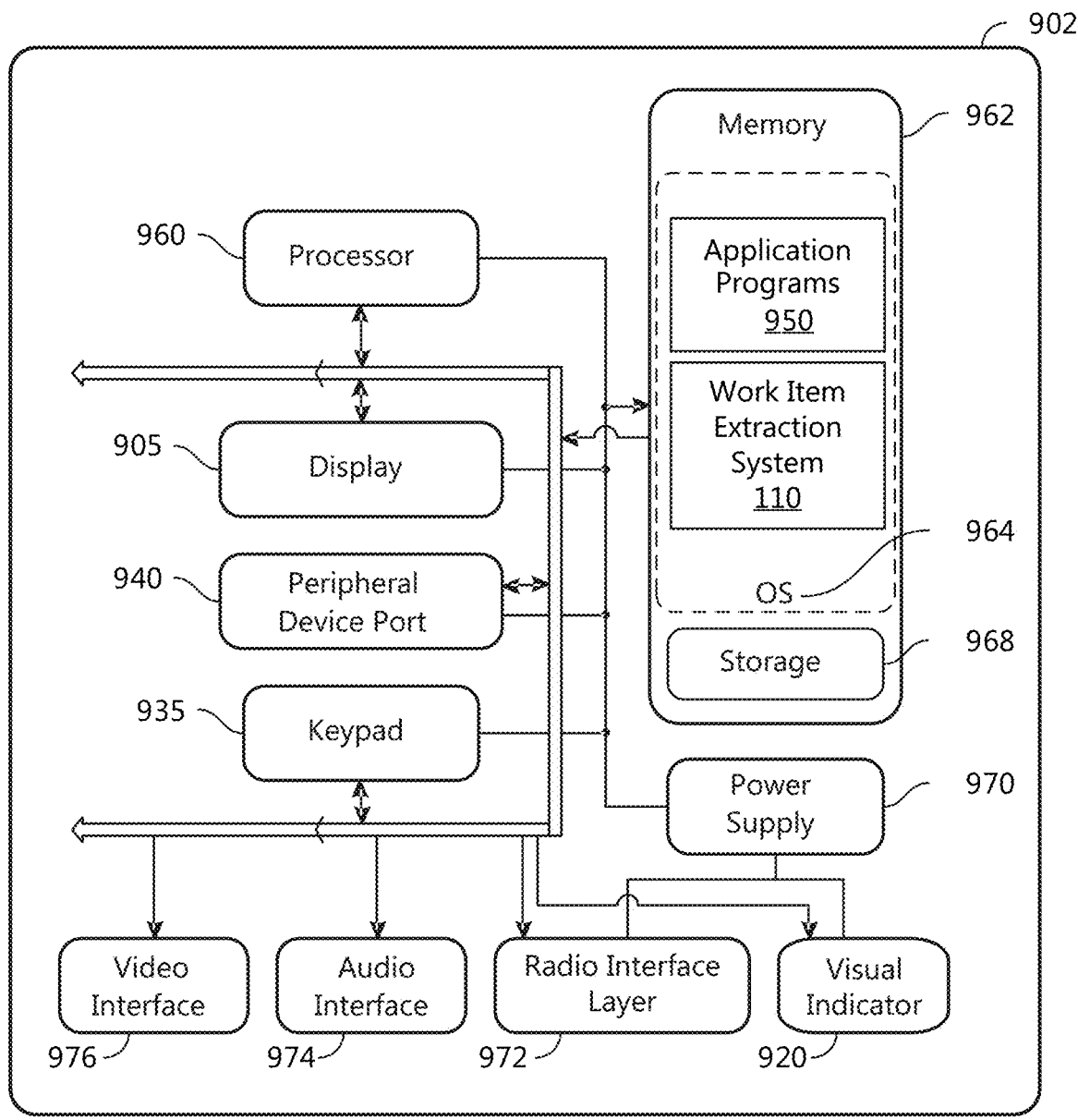
Figure 10:
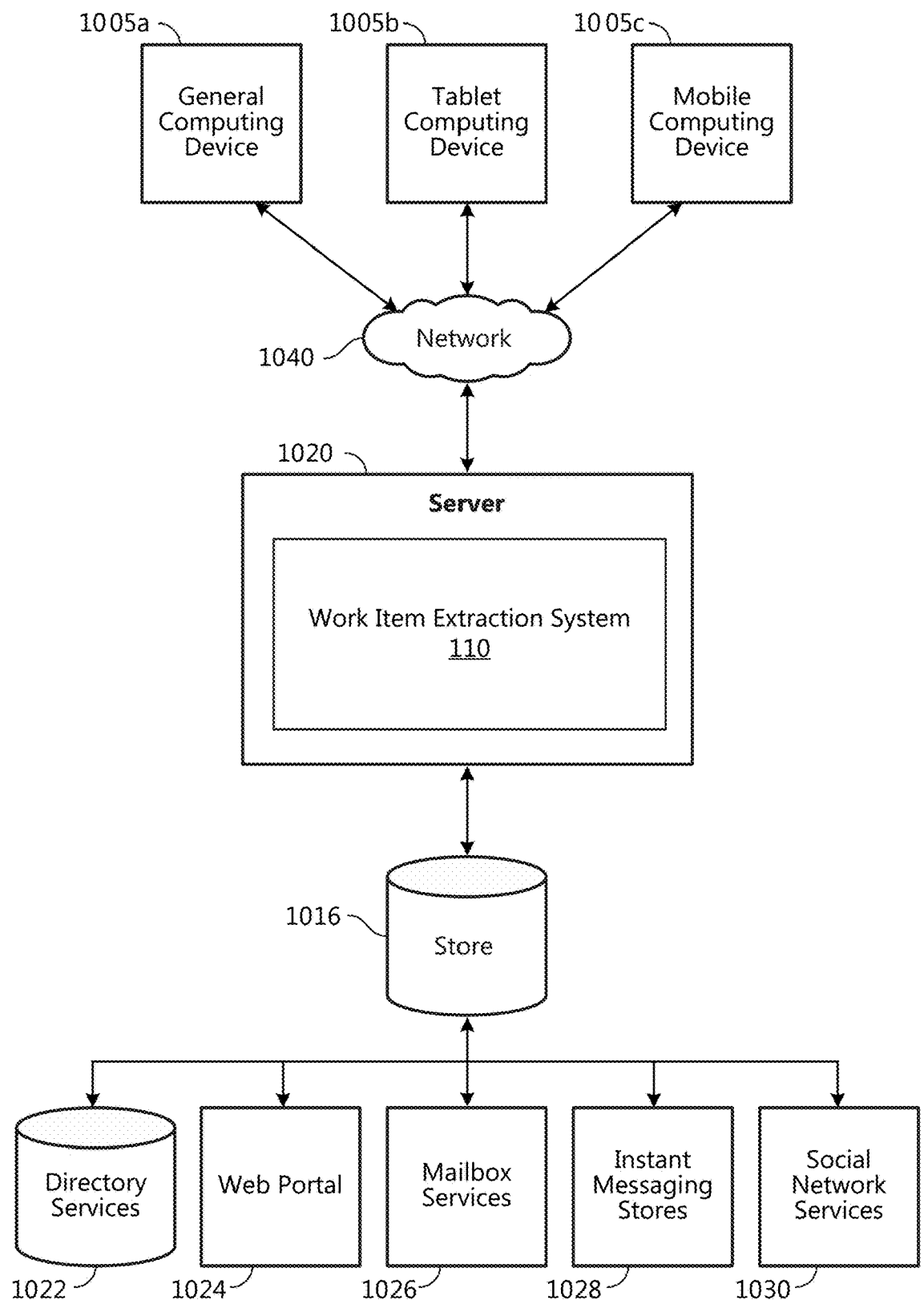
FIG. 10 is a simplified block diagram of a distributed computing system.

FIGS. 8-10 and the associated descriptions provide a discussion of a variety of operating environments in which examples are practiced. However, the devices and systems illustrated and discussed with respect to FIGS. 8-10 are for purposes of example and illustration and are not limiting of a vast number of computing device configurations that are utilized for practicing aspects, described herein.

FIG. 8 is a block diagram illustrating physical components (i.e., hardware) of a computing device 800 with which examples of the present disclosure may be practiced. In a basic configuration, the computing device 800 includes at least one processing unit 802 and a system memory 804. According to an aspect, depending on the configuration and type of computing device, the system memory 804 comprises, but is not limited to, volatile storage (e.g., random access memory), non-volatile storage (e.g., read-only memory), flash memory, or any combination of such memories. According to an aspect, the system memory 804 includes an operating system 805 and one or more program modules 806 suitable for running software applications 850. According to an aspect, the system memory 804 includes the work item extraction system 110. The operating system 805, for example, is suitable for controlling the operation of the computing device 800. Furthermore, aspects are practiced in conjunction with a graphics library, other operating systems, or any other application program, and are not limited to any particular application or system. This basic configuration is illustrated in FIG. 8 by those components within a dashed line 808. According to an aspect, the computing device 800 has additional features or functionality. For example, according to an aspect, the computing device 800 includes additional data storage devices (removable and/or non-removable) such as, for example, magnetic disks, optical disks, or tape. Such additional storage is illustrated in FIG. 8 by a removable storage device 809 and a non-removable storage device 810.

As stated above, according to an aspect, a number of program modules and data files are stored in the system memory 804. While executing on the processing unit 802, the program modules 806 (e.g., work item extraction system 110) perform processes including, but not limited to, one or more of the stages of the method 700 illustrated in FIG. 7. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 8 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 800 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 800 has one or more input device(s) 812 such as a keyboard, a mouse, a pen, a sound input device, a touch input device, etc. The output device(s) 814 such as a display, speakers, a printer, etc. are also included according to an aspect. The aforementioned devices are examples and others may be used. According to an aspect, the computing device 800 includes one or more communication connections 816 allowing communications with other computing devices 818. Examples of suitable communication connections 816 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. According to an aspect, any such computer storage media is part of the computing device 800. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 9A and 9B illustrate a mobile computing device 900, for example, a mobile telephone, a smart phone, a tablet personal computer, a laptop computer, and the like, with which aspects may be practiced. With reference to FIG. 9A, an example of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. According to an aspect, the display 905 of the mobile computing device 900 functions as an input device (e.g., a touch screen display). If included, an optional side input element 915 allows further user input. According to an aspect, the side input element 915 is a rotary switch, a button, or any other type of manual input element. In alternative examples, mobile computing device 900 incorporates more or less input elements. For example, the display 905 may not be a touch screen in some examples. In alternative examples, the mobile computing device 900 is a portable phone system, such as a cellular phone. According to an aspect, the mobile computing device 900 includes an optional keypad 935. According to an aspect, the optional keypad 935 is a physical keypad. According to another aspect, the optional keypad 935 is a "soft" keypad generated on the touch screen display. In various aspects, the output elements include the display 905 for showing a graphical user interface (GUI), a visual indicator 920 (e.g., a light emitting diode), and/or an audio transducer 925 (e.g., a speaker). In some examples, the mobile computing device 900 incorporates a vibration transducer for providing the user with tactile feedback. In yet another example, the mobile computing device 900 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 900 incorporates peripheral device port 940, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one example of a mobile computing device. That is, the mobile computing device 900 incorporates a system (i.e., an architecture) 902 to implement some examples. In one example, the system 902 is implemented as a "smart phone" capable of running one or more applications (e.g., browser, e-mail, calendaring, contact managers, messaging clients, games, and media clients/players). In some examples, the system 902 is integrated as a computing device, such as an integrated personal digital assistant (PDA) and wireless phone.

According to an aspect, one or more application programs 950 are loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. According to an aspect, the work item extraction system 110 is loaded into memory 962. The system 902 also includes a non-volatile storage area 968 within the memory 962. The non-volatile storage area 968 is used to store persistent information that should not be lost if the system 902 is powered down. The application programs 950 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900.

According to an aspect, the system 902 has a power supply 970, which is implemented as one or more batteries. According to an aspect, the power supply 970 further includes an external power source, such as an AC adapter or a powered docking cradle that supplements or recharges the batteries.

According to an aspect, the system 902 includes a radio 972 that performs the function of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 950 via the operating system 964, and vice versa.

According to an aspect, the visual indicator 920 is used to provide visual notifications and/or an audio interface 974 is used for producing audible notifications via the audio transducer 925. In the illustrated example, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. According to an aspect, the system 902 further includes a video interface 976 that enables an operation of an on-board camera 930 to record still images, video stream, and the like.

According to an aspect, a mobile computing device 900 implementing the system 902 has additional features or functionality. For example, the mobile computing device 900 includes additional data storage devices (removable and/or non-removable) such as, magnetic disks, optical disks, or tape. Such additional storage is illustrated in FIG. 9B by the non-volatile storage area 968.

According to an aspect, data/information generated or captured by the mobile computing device 900 and stored via the system 902 is stored locally on the mobile computing device 900, as described above. According to another aspect, the data is stored on any number of storage media that is accessible by the device via the radio 972 or via a wired connection between the mobile computing device 900 and a separate computing device associated with the mobile computing device 900, for example, a server computer in a distributed computing network, such as the Internet. As should be appreciated such data/information is accessible via the mobile computing device 900 via the radio 972 or via a distributed computing network. Similarly, according to an aspect, such data/information is readily transferred between computing devices for storage and use according to well-known data/information transfer and storage means, including electronic mail and collaborative data/information sharing systems.

FIG. 10 illustrates one example of the architecture of a system for providing inline command functionality for creating a work item 124 as described above. Content developed, interacted with, or edited in association with the work item extraction system 110 is enabled to be stored in different communication channels or other storage types. For example, various documents may be stored using a directory service 1022, a web portal 1024, a mailbox service 1026, an instant messaging store 1028, or a social networking site 1030. The work item extraction system 110 is operative to use any of these types of systems or the like for providing work item creation, as described herein. According to an aspect, a server 1020 provides the work item extraction system 110 to clients 1005a,b,c. As one example, the server 1020 is a web server providing the work item extraction system 110 over the web. The server 1020 provides the work item extraction system 110 over the web to clients 1005 through a network 1040. By way of example, the client computing device is implemented and embodied in a personal computer 1005a, a tablet computing device 1005b or a mobile computing device 1005c (e.g., a smart phone), or other computing device. Any of these examples of the client computing device are operable to obtain content from the store 1016.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

I claim:

1. A computer-implemented method for creating a work item from action item data in a productivity application document, comprising:

accessing a productivity application that is executing on a client computing device, wherein an action item related to a project is received as input to a document of the productivity application;

receiving a string associated with the action item from the document;

parsing the string for attributes defining a work item;

transmitting the parsed attributes to a work item tracking system that manages the project that the action item is related to, wherein the work item tracking system is implemented on a server communicatively coupled to the client computing device over a network, and the work item tracking system creates the work item for the project based on the parsed attributes;

receiving a link to the work item from the work item tracking system;
embedding the link into the document; and
in response to detecting a selection of the embedded link in the document, opening the work item in the work item tracking system from the document.

2. The method of claim 1, wherein receiving the string comprises receiving the string in response to a selection of the string and a subsection selection of a command to create the work item from the selected string.

3. The method of claim 1, wherein receiving the string comprises:
parsing the document for the string comprising the attributes defining the work item; and
extracting the string comprising the attributes defining the work item from the document.

4. The method of claim 1, further comprising:
identifying the project to which to add the work item; and
connecting to the project in the work item tracking system.

5. The method of claim 1, further comprising:
creating a link to the document; and
transmitting the link to the work item tracking system for enabling direct access to the document from the work item tracking system.

6. The method of claim 1, further comprising:
creating a communication with the work item tracking system;
accessing the work item for checking a status of the work item; and
updating the document with the status of the work item.

7. The method of claim 6, wherein updating the document with the status of the work item comprises updating the document with a status indicator, the status indicator providing an indication as to whether the work item is completed, pending, or overdue.

8. The method of claim 1, wherein parsing the string for the attributes defining the work item comprises parsing the string for:
the action item;
a person or team to whom the action item is assigned; and
a target date for completion of the action item.

9. The method of claim 8, wherein transmitting the parsed attributes to the work item tracking system comprises configuring the parsed attributes in a selected arrangement, wherein:
the action item maps to a title field;
the person or team to whom the action item is assigned maps to an assigned to field; and
the target date for completion of the action item maps to a due date field.

10. A system for creating a work item from action item data in a productivity application document, the system comprising:
a processing device; and
a computer readable data storage device storing instructions that, when executed by the processing device, cause a computing device to:
access a productivity application that is executing on a client computing device, wherein an action item related to a project is received as input to a document of the productivity application;
receive a string associated with the action item from the document;
parse the string for attributes defining a work item;
transmit the parsed attributes to a work item tracking system that manages the project that the action item is related to, wherein the work item tracking system is implemented on a server communicatively coupled to the client computing device over a network, and the work item tracking system creates the work item for the project based on the parsed attributes;
receive a link to the work item from the work item tracking system;
embed the link into the document; and
in response to detecting a selection of the embedded link in the document, open the work item in the work item tracking system from the document.

11. The system of claim 10, wherein in receiving the string, the computing device is operative to receive the string in response to a selection of the string and a subsection selection of a command to create the work item from the selected string.

12. The system of claim 11, wherein the command to create the work item is provided in a contextual menu or in a toolbar of a user interface of the productivity application.

13. The system of claim 10, wherein in receiving the string, the computing device is operative to:
parse the document for the string comprising the attributes defining the work item; and
extract the string comprising the attributes defining the work item from the document.

14. The system of claim 10, wherein the computing device is further operative to:
create a link to the document; and
add the link to a field of a work item creation form in the work item tracking system for enabling direct access to the document from the work item tracking system.

15. The system of claim 10, wherein the computing device is further operative to:
create a communication with the work item tracking system;
access the work item for checking a status of the work item; and
update the document with the status of the work item.

16. The system of claim 15, wherein in updating the document with the status of the work item, the computing device is operative to update the document with a status indicator, the status indicator providing an indication as to whether the work item is completed, pending, or overdue.

17. The system of claim 10, wherein the computing device is further operative to identify the project to which to add the work item.

18. The system of claim 17, wherein prior to transmitting the parsed attributes defining the work item to the work item tracking system, the computing device is further operative to connect to the project.

19. A computer readable storage media including computer readable instructions, which when executed by a processing unit is operative to provide a work item extraction system, the work item extraction system operative to:
access a productivity application that is executing on a client computing device, wherein an action item related to a project is received as input to a document of the productivity application;
receive a string associated with the action item from the document;
parse the string for attributes defining a work item;
identify the project to which to add the work item;
transmit the parsed attributes to a work item tracking system that manages the project, wherein the work item tracking system is implemented on a server communicatively coupled to the client computing device over a network, and the work item tracking system creates the work item based on the parsed attributes and adds the work item to the project;

receive a link to the work item;

embed the link into the document;

in response to detecting a selection of the embedded link in the document, opening the work item in the work item tracking system from the document;

create a subsequent communication with the work item tracking system;

access the work item for checking a status of the work item; and update the document with the status of the work item.

20. The computer readable storage media of claim 19, wherein in receiving the string, the work item extraction system is operative to:

receive the string in response to a selection of the string and a subsection selection of a command to create the work item from the selected string; or parse the document for the string comprising the attributes defining the work item; and extract the string comprising the attributes defining the work item from the document.

\* \* \* \* \*